(12) United States Patent
Takamura et al.

(10) Patent No.: US 10,890,073 B2
(45) Date of Patent: Jan. 12, 2021

(54) TURBINE BLADE AND GAS TURBINE

(71) Applicant: Mitsubishi Hitachi Power Systems, Ltd., Kanagawa (JP)

(72) Inventors: Keita Takamura, Yokohama (JP); Satoshi Hada, Yokohama (JP); Hidekatsu Atsumi, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 385 days.

(21) Appl. No.: 15/576,090

(22) PCT Filed: Aug. 23, 2016

(86) PCT No.: PCT/JP2016/074487
§ 371 (c)(1),
(2) Date: Nov. 21, 2017

(87) PCT Pub. No.: WO2017/033920
PCT Pub. Date: Mar. 2, 2017

(65) Prior Publication Data
US 2018/0149024 A1    May 31, 2018

(30) Foreign Application Priority Data
Aug. 25, 2015    (JP) .................. 2015-165540

(51) Int. Cl.
*F01D 5/18* (2006.01)
*F02C 7/18* (2006.01)
*F01D 5/22* (2006.01)

(52) U.S. Cl.
CPC ............. *F01D 5/187* (2013.01); *F01D 5/186* (2013.01); *F01D 5/225* (2013.01); *F02C 7/18* (2013.01);
(Continued)

(58) Field of Classification Search
None
See application file for complete search history.

(56) References Cited

U.S. PATENT DOCUMENTS

| 5,482,435 A * | 1/1996 | Dorris | F01D 5/08 416/97 R |
| 6,811,378 B2 * | 11/2004 | Kraft | F01D 5/18 416/191 |

(Continued)

FOREIGN PATENT DOCUMENTS

| CN | 1162346 | 10/1997 |
| CN | 101627182 | 1/2010 |

(Continued)

OTHER PUBLICATIONS

International Search Report dated Oct. 25, 2016 in International (PCT) Application No. PCT/JP2016/074487.
(Continued)

*Primary Examiner* — Kayla McCaffrey
(74) *Attorney, Agent, or Firm* — Wenderoth, Lind & Ponack, L.L.P.

(57) ABSTRACT

A turbine blade (43a) is provided with a blade main body (51) and a tip shroud (52). The blade main body (51) is provided with a leading edge-side cooling passage (64), a trailing edge-side cooling passage (67), and a middle cooling passage (65). The tip shroud (52) is provided with a first discharge passage (72), a second discharge passage (73), and a third discharge passage (74). The first discharge passage (72) discharges a cooling medium flowing through the leading edge-side cooling passage (64). The second discharge passage (73) discharges a cooling medium flowing through the trailing edge-side cooling passage (67). The third discharge passage (74) discharges a cooling medium flowing through the middle cooling passage (65).

8 Claims, 9 Drawing Sheets

(52) U.S. Cl.
CPC ...... *F05D 2220/32* (2013.01); *F05D 2240/81* (2013.01); *F05D 2260/2212* (2013.01)

(56) References Cited

U.S. PATENT DOCUMENTS

| | | |
|---|---|---|
| 2002/0150474 A1 | 10/2002 | Balkcum, III et al. |
| 2009/0035128 A1 | 2/2009 | Ahmad |

FOREIGN PATENT DOCUMENTS

| | | |
|---|---|---|
| JP | 62-282102 | 12/1987 |
| JP | 3-194101 | 8/1991 |
| JP | 5-195704 | 8/1993 |
| JP | 8-200002 | 8/1996 |
| JP | 9-53407 | 2/1997 |
| JP | 9-303103 | 11/1997 |
| JP | 10-212903 | 8/1998 |
| JP | 11-500507 | 1/1999 |
| JP | 2002-349205 | 12/2002 |
| JP | 5489597 | 5/2014 |

OTHER PUBLICATIONS

Written Opinion of the International Searching Authority dated Oct. 25, 2016 in International (PCT) Application No. PCT/JP2016/074487, with English translation.

* cited by examiner

TURBINE BLADE AND GAS TURBINE

TECHNICAL FIELD

The present invention relates to a turbine blade and a gas turbine.

This application claims priority based on Japanese Patent Application No. 2015-165540 filed in Japan on Aug. 25, 2015, of which the contents are incorporated herein by reference.

BACKGROUND ART

A turbine blade in a gas turbine is exposed to a high-temperature, high-pressure working fluid, and therefore, is internally provided with a cooling structure. Specifically, for example, a flow channel is internally provided as a cooling structure, and compressed air extracted from a compressor flows through the flow channel as cooling air to cool the turbine blade from the inside. With a front stage-side turbine blade and a rear stage-side turbine blade of a gas turbine, the temperature of a working fluid flowing in the periphery, length of the turbine blades themselves, and the like are different, and therefore, the cooling conditions are different. Therefore, the structure of the cooling flow channel inside the turbine blade is also different between the front stage side and the rear stage side.

Patent Document 1 discloses one example of a rear stage-side cooling structure. Specifically, a turbine blade described in Patent Document 1 has a cavity that has a pin fin protruding from an inner wall and is provided inside a hub portion and a blade root portion, and multiholes that connect the cavity and an opening provided on a blade tip portion and pass cooling air from the cavity to the opening are formed inside the blade on a blade tip side from the hub portion.

CITATION LIST

Patent Documents

Patent Document 1: JP H09-53407A

SUMMARY OF INVENTION

Technical Problems

In general, as the flow velocity of cooling air increases, the heat transfer coefficient increases. In other words, as the flow velocity of cooling air increases, the cooling performance can be increased. In order to increase the flow velocity of the cooling air, high-pressure cooling air must be supplied. However, when high-pressure cooling air is supplied, the amount of leakage flow on a blade root portion side increases, and therefore, the supply amount of cooling air increases. The cooling air which is a cooling medium for the gas turbine blade as described above is generated by extracting air from a compressor, for example. The air extracted from the compressor in this manner is used for cooling a turbine blade or the like without being used for the task of rotating the turbine. In other words, in order to improve the performance of a gas turbine, the amount of cooling medium used for the turbine blade must be minimized.

An object of the present invention is to provide a turbine blade and a gas turbine which can effectively perform cooling while minimizing the supplied amount of a cooling medium.

Solution to Problem

According to a first aspect of the invention, a turbine blade is provided with a blade main body and a tip shroud. The blade main body has a leading edge and a trailing edge, and has a positive pressure surface and a negative pressure surface between the leading edge and the trailing edge. The tip shroud is provided on a blade tip of the blade main body. The blade main body is provided with a leading edge-side cooling passage, a trailing edge-side cooling passage, and a middle cooling passage. The leading edge-side cooling passage is provided near the leading edge, and a cooling medium flows therethrough. The trailing edge-side cooling passage is provided near the trailing edge, and a cooling medium flows therethrough. The middle cooling passage is provided between the leading edge-side cooling passage and the trailing edge-side cooling passage, and a cooling medium flows therethrough. The tip shroud is provided with a first discharge passage, a second discharge passage, and a third discharge passage. The first discharge passage discharges the cooling medium flowing through the leading edge-side cooling passage. The second discharge passage discharges the cooling medium flowing through the trailing edge-side cooling passage. The third discharge passage discharges the cooling medium flowing through the middle cooling passage.

Based on this configuration, the cooling medium flowing through the leading edge-side cooling passage toward the blade tip from a base portion of the blade main body can be discharged to the outside through the first discharge passage of the tip shroud. Furthermore, the cooling medium flowing through the trailing edge-side cooling passage toward the blade tip from the base portion of the blade main body can be discharged to the outside through the second discharge passage of the tip shroud. Furthermore, the cooling medium flowing through the middle cooling passage toward the blade tip from the base portion of the blade main body can be discharged to the outside through the third discharge passage. Therefore, the flow velocity of the cooling medium flowing through the leading edge-side cooling passage and the trailing edge-side cooling passage can be increased, and the leading edge and the trailing edge which reach relatively high temperatures can be intensively cooled. Furthermore, with regard to a portion with a relatively low temperature between the leading edge and the trailing edge, the flow velocity of the cooling medium flowing through the middle cooling passage can be reduced, and thus an excess supply of the cooling medium can be suppressed. As a result, the blade main body can be effectively cooled while the supply amount of the cooling medium is minimized.

According to a second aspect of the invention, the first discharge passage of the turbine blade according to the first aspect may penetrate the tip shroud in a blade height direction.

Based on this configuration, the first discharge passage can be formed to be shorter. Therefore, pressure loss of the cooling medium flowing through the leading edge-side passage can be suppressed from increasing, and thus the flow velocity of the cooling medium can be suppressed from decreasing. As a result, the leading edge of the blade main body can be efficiently cooled.

According to a third aspect of the invention, the second discharge passage of the turbine blade according to the first or second aspect may penetrate the tip shroud in the blade height direction.

Based on this configuration, the second discharge passage can be formed to be shorter. Therefore, pressure loss of the cooling medium flowing through the trailing edge-side cooling passage can be suppressed from increasing, and thus the flow velocity of the cooling medium can be suppressed from decreasing. As a result, the trailing edge of the blade main body can be efficiently cooled.

According to a fourth aspect of the invention, the third discharge passage of the turbine blade according to any one of the first to third aspects may be provided with a passage main body portion extending in a direction intersecting the blade height direction. The passage main body portion may open in a side surface of the tip shroud.

Based on this configuration, the tip shroud can be cooled by the cooling medium flowing through the third discharge passage while the cooling medium flowing through the middle cooling passage is discharged to the outside through the third discharge passage.

Furthermore, the third discharge passage can be increased in length as compared to the first discharge passage and the second discharge passage, and therefore, pressure loss can be increased and the flow velocity of the cooling medium flowing through the middle cooling passage can be reduced. Therefore, a temperature differential occurring between the leading and trailing edges and an area between the leading edge and the trailing edge can be suppressed, and thus thermal warping or the like can be reduced.

According to a fifth aspect of the invention, the third discharge passage of the turbine blade according to the fourth aspect may be provided with a cavity portion that connects to the middle cooling passage and has a larger flow channel cross-sectional area than the middle cooling passage. The passage main body portion may extend in a direction intersecting the blade height direction from the cavity portion, and open in a side surface of the tip shroud.

Based on this configuration, the third discharge passage can be easily formed in the tip shroud.

According to a sixth aspect of the invention, a gas turbine may be provided with the turbine blade according to any one of the first to fifth aspects.

Based on this configuration, the amount of cooling air for cooling the turbine blade can be reduced, and therefore, efficiency can be improved.

Advantageous Effects of Invention

With the above-described turbine blades and gas turbine, it is possible to realize efficient cooling while suppressing an increase in the amount of cooling air.

DESCRIPTION OF EMBODIMENTS

First Embodiment

Next, a turbine blade and a gas turbine according to a first embodiment of the invention are described based on the drawings.

Figure 1:
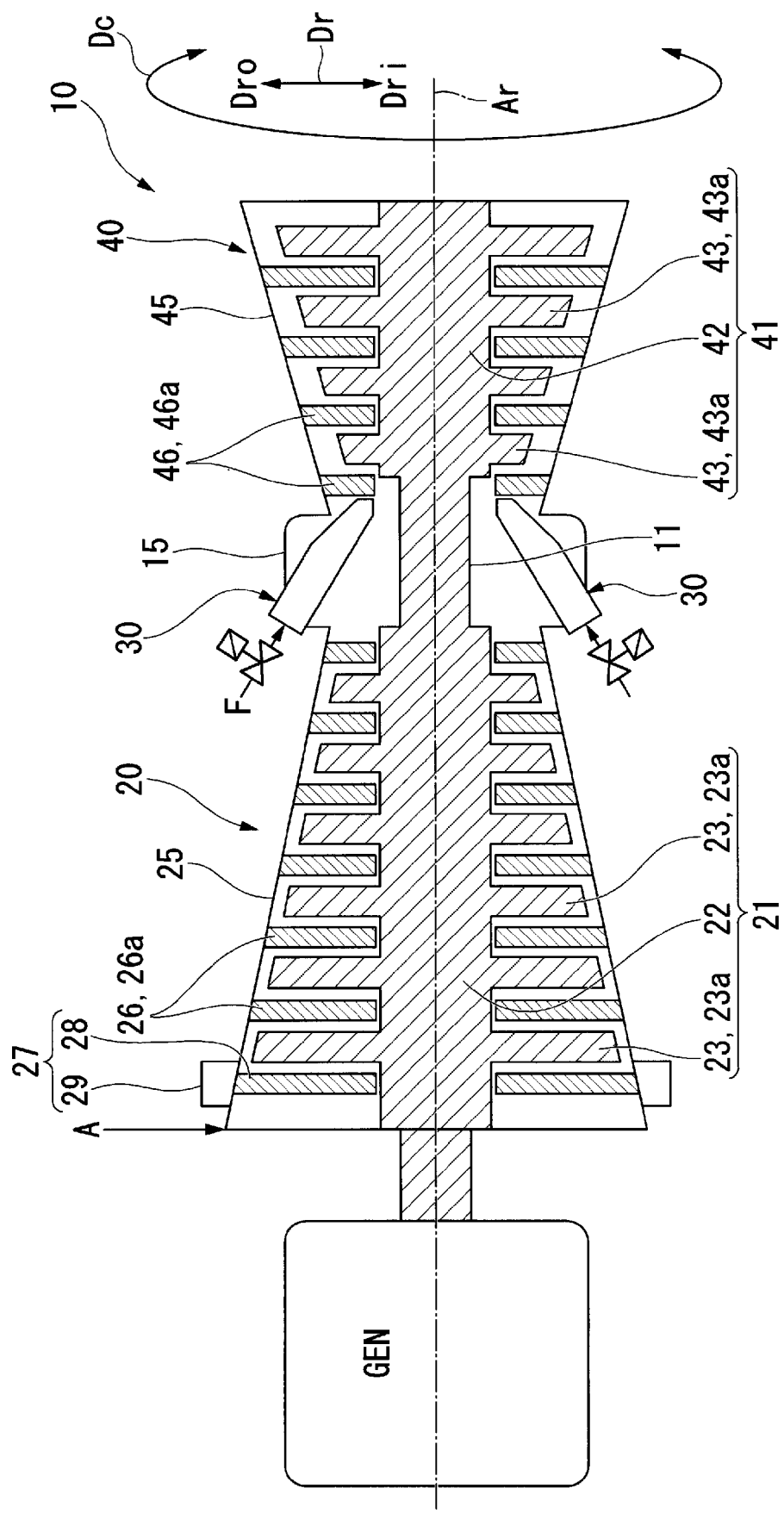
FIG. 1 is a schematic cross-sectional view of a gas turbine according to a first embodiment of the invention.

FIG. 1 is a schematic cross-sectional view of the gas turbine according to the first embodiment of the invention.

As illustrated in FIG. 1, a gas turbine 10 of the present embodiment is provided with a compressor 20, a combustor 30, and a turbine 40.

In the description below, a direction in which an axis Ar extends is referred to as an axial direction Da. Furthermore, a circumferential direction centering around the axis Ar is simply referred to as a circumferential direction Dc. Furthermore, a direction orthogonal to the axis Ar is referred to as a radial direction Dr. Furthermore, a compressor 20 side with the turbine 40 as a reference in the axial direction Da is referred to as an upstream side Dau, and an opposite side thereof is referred to as a downstream side Dad. Furthermore, a side near the axis Ar in the radial direction Dr is referred to as inner side in the radial direction Dri, and an opposite side thereof is referred to as outer side in the radial direction Dro.

The compressor 20 compresses and then supplies air A to the combustor 30. The compressor 20 is provided with a compressor rotor 21, a compressor casing 25, a plurality of blade rows 23, a plurality of vane rows 26, and an IGV (inlet guide vane) 27.

The compressor rotor 21 rotates around the axis Ar. The compressor rotor 21 is provided with a rotor shaft 22 and the plurality of blade rows 23. The rotor shaft 22 extends in the axial direction Da around the axis Ar. The blade rows 23 are disposed in the axial direction Da. The blade rows 23 are each provided with a plurality of blades 23a in the circumferential direction Dc. The plurality of blades 23a are attached to the rotor shaft 22.

The compressor casing 25 covers the compressor rotor 21.

The plurality of vane rows 26 are respectively disposed on the downstream side Dad of the blade rows 23. The vane rows 26 are disposed between the compressor casing 25 and the compressor rotor 21, and are each provided with a plurality of vanes 26a in the circumferential direction Dc.

The IGV 27 is provided at a suction port of the compressor casing 25. The IGV 27 adjusts the flow rate of the air A suctioned in the compressor casing 25. The IGV 27 is provided with a plurality of guide vanes 28 and a driver 29 that drives the plurality of guide vanes 28.

The combustor 30 combusts fuel in air compressed by the compressor 20, and generates high-temperature, high-pressure combustion gas. The combustion gas is supplied to the turbine 40.

The turbine 40 is driven using the combustion gas generated by the combustor 30. The turbine 40 is provided with a turbine rotor 41, a turbine casing 45, a plurality of blade rows 43, and a plurality of vane rows 46.

The turbine rotor 41 rotates around the axis Ar. The turbine rotor 41 and the compressor rotor 21 described above are connected to each other and positioned on the same axis Ar. A gas turbine rotor 11 is configured from the turbine rotor 41 and the compressor rotor 21. The gas turbine rotor 11 is connected to a rotor of a generator GEN, for example.

The turbine casing 45 covers the turbine rotor 41. The turbine casing 45 and the compressor casing 25 are connected to each other. A gas turbine casing 15 is configured from the turbine casing 45 and the compressor casing 25.

Figure 2:
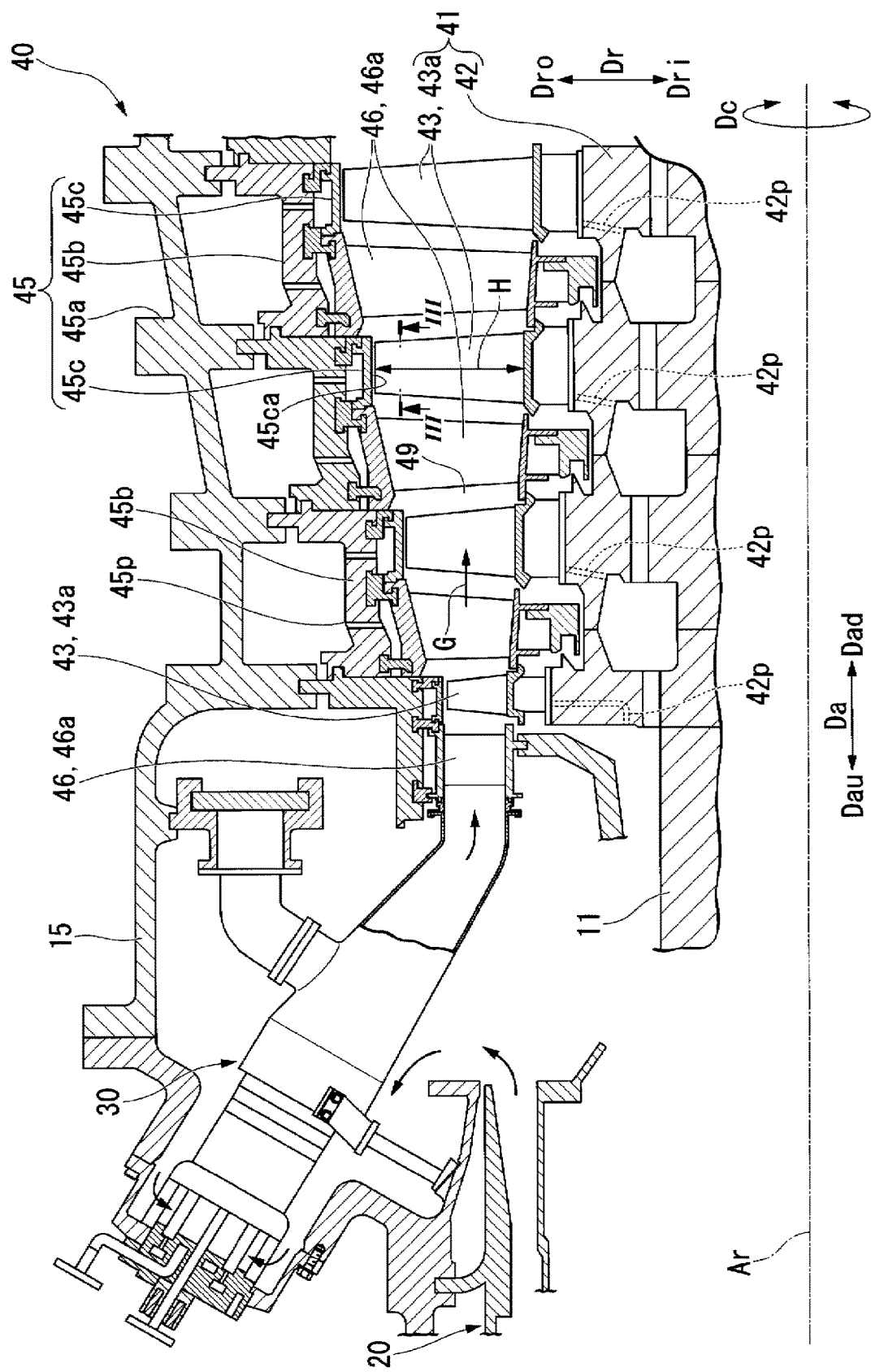
FIG. 2 is a cross-sectional view of a main portion of the gas turbine according to the first embodiment of the invention.

FIG. 2 is a cross-sectional view of a main portion of the gas turbine according to the first embodiment of the invention.

As illustrated in FIG. 2, the turbine rotor 41 is provided with a rotor shaft 42 and a plurality of blade rows 43.

The rotor shaft 42 extends in the axial direction Da around the axis Ar.

The plurality of blade rows 43 are disposed in the axial direction Da. The turbine rotor 41 in the present embodiment is provided with four blade rows 43. The blade rows 43 are each provided with a plurality of blades (turbine blades) 43a aligned in the circumferential direction Dc. The plurality of blades 43a are attached to the rotor shaft 42.

The plurality of vane rows 46 are respectively disposed on the upstream side Dau of the blade rows 43. The plurality of vane rows 46 are each provided with a plurality of vanes 46a in the circumferential direction Dc.

The turbine casing 45 is provided with an outer casing 45a, an inner casing 45b, and a plurality of ring segments 45c.

The outer casing 45a is formed into a cylindrical shape forming an outer shell of the turbine casing 45.

The inner casing 45b is positioned inside the outer casing 45a, and is formed in a cylindrical shape by a plurality of circular rings. The inner casing 45b is secured to the outer casing 45a.

The ring segments 45c are positioned inside the inner casing 45b, and are disposed between adjacent vane rows 46 in the axial direction Da. In other words, the blade rows 43 are disposed on the inner side in the radial direction Dri of the ring segments 45c.

A ring-shaped space in which the vanes 46a and the blades 43a are disposed is formed between the rotor shaft 42 and turbine casing 45. The ring-shaped space is a combustion gas flow channel 49 through which combustion gas G supplied from the combustor 30 flows.

A cooling air passage 42p for cooling air to flow through is formed in the rotor shaft 42. The cooling air passing through the cooling air passage 42p is introduced inside the blades 43a and then used to cool the blades 43a.

Similarly, a cooling air passage 45p for cooling air to flow through is formed in the inner casing 45b. The cooling air passage 45p penetrates the inner casing 45b from the outer side in the radial direction Dro to the inner side in the radial direction Dri. The cooling air passing through the cooling air passage 45p is introduced inside the vanes 46a and inside the ring segment 45c, and then used to cool the vanes 46a and the ring segment 45c.

Herein, a case where the cooling air is introduced inside the vane 46a through the cooling air passage 45p was described. However, depending on the vane row 46, air inside the gas turbine casing 15 may be supplied as cooling air to the vanes 46a configuring the vane row 46 without passing through the cooling air passage 45p in the casing.

Figure 3:
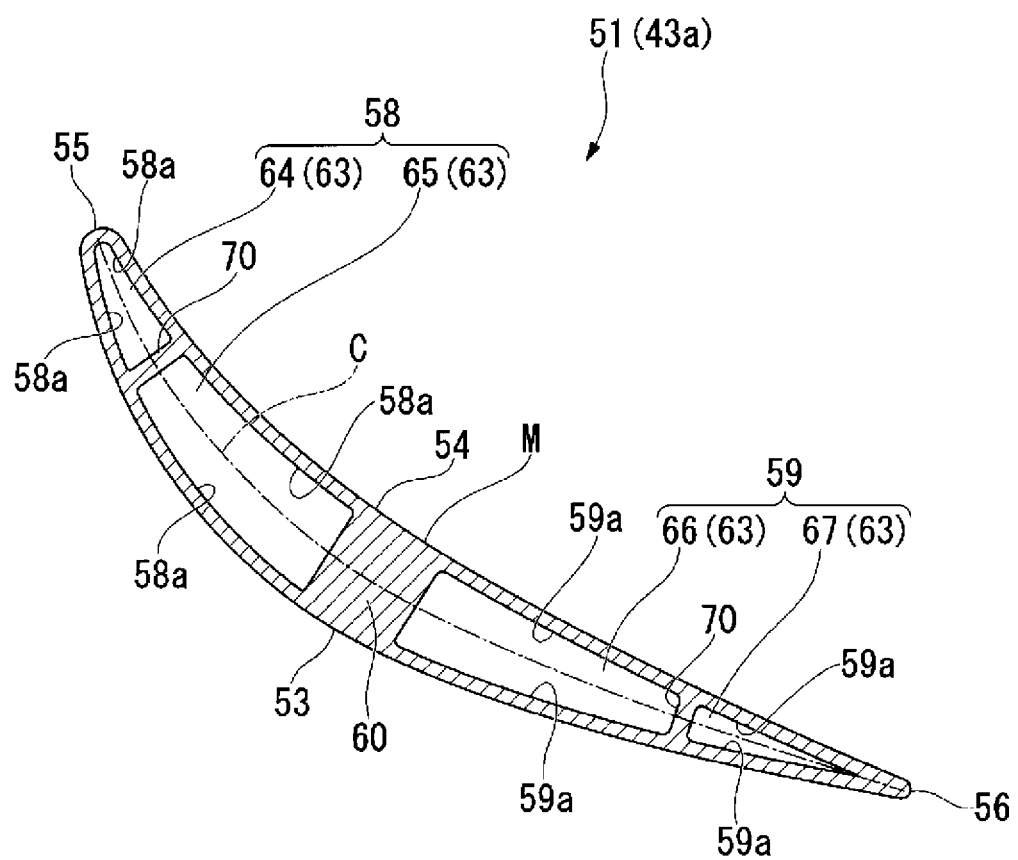
FIG. 3 is a cross-sectional view along line in FIG. 2 according to the first embodiment of the invention.
Figure 4:
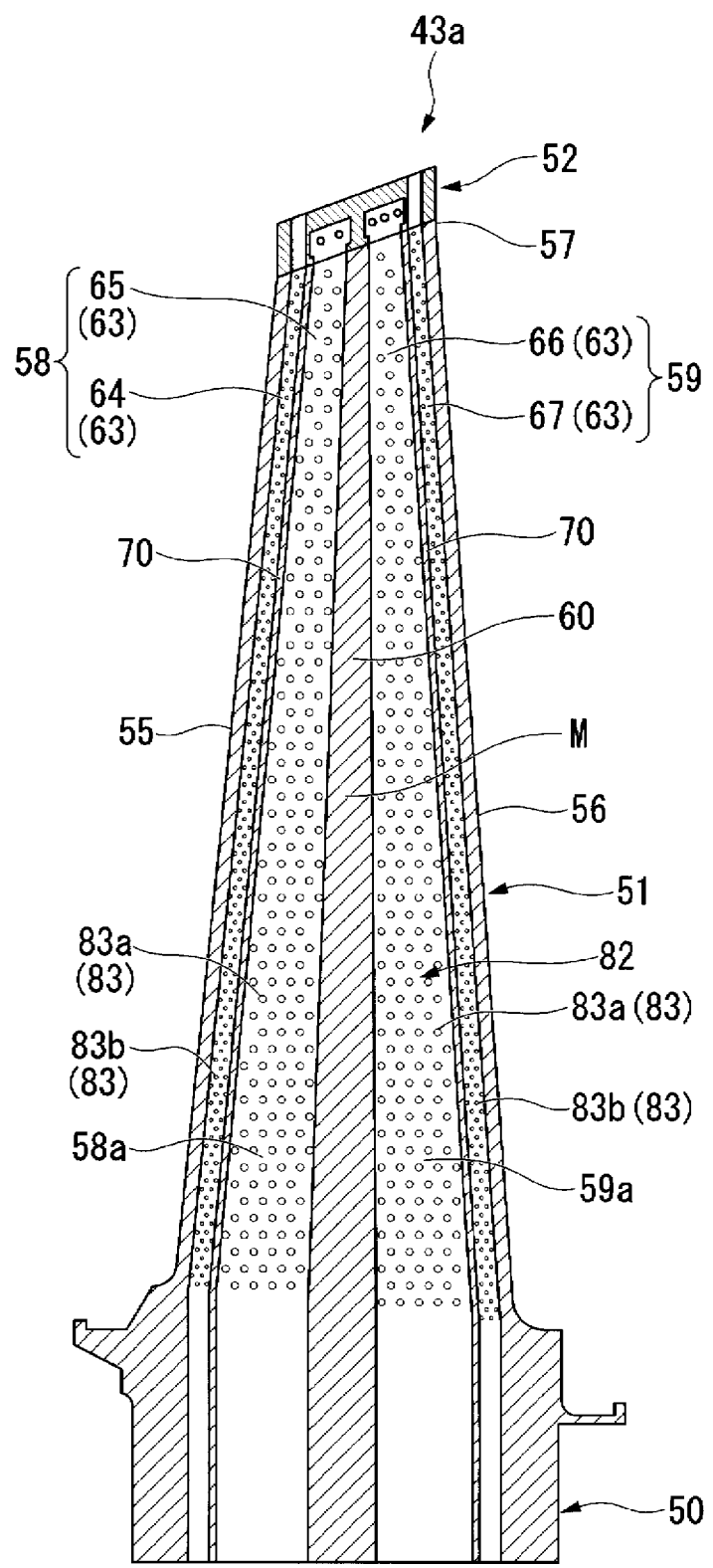
FIG. 4 is a cross section along a camber line of a blade according to the first embodiment of the invention.

FIG. 3 is a cross-sectional view along line in FIG. 2 according to the first embodiment of the invention. FIG. 4 is a cross section along a camber line of a blade according to the first embodiment of the invention.

The blade 43a illustrated in FIG. 3 is, for example, a blade 43a configuring a third blade row 43 as viewed from an upstream side, of the four blade rows 43 provided as described above. As illustrated in FIG. 4, the blade 43a is provided with a blade root 50, blade main body 51, and tip shroud 52.

As illustrated in FIG. 3, the blade main body 51 is provided with an outward curved negative pressure surface 53, inward curved positive pressure surface 54, leading edge 55, and trailing edge 56. The leading edge 55 is an end portion on the most upstream side Dau in an extension direction of the camber line C which is an airfoil center line. The trailing edge is an end portion on the most downstream side Dad in the extension direction of the camber line C. The blade main body 51 has an airfoil cross section formed by the negative pressure surface 53 and the positive pressure surface 54 continuously extending across the leading edge 55 and the trailing edge 56. The blade main body 51 of the blade 43a provided in the third blade row 43 has a large blade height H (refer to FIG. 2) as compared to the blade main body 51 of a blade 43a in the first or second blade row 43. Furthermore, the blade main body 51 is formed in a tapered shape where the width gradually decreases from the blade root 50 to a blade tip 57.

The blade 43a is internally provided with a first cooling passage portion 58, second cooling passage portion 59, and pillar portion 60. The first cooling passage portion 58 is provided near the leading edge 55. The second cooling passage portion 59 is provided near the trailing edge 56. As illustrated in FIG. 4, the first cooling passage portion 58 and the second cooling passage portion 59 extend in the blade height direction (radial direction Dr) which is a direction intersecting the aforementioned airfoil cross section. Furthermore, the first cooling passage portion 58 and the second cooling passage portion 59 penetrate from the blade root 50 (base portion) to the blade tip 57 (tip portion) of the blade 43a.

The inside of the first cooling passage portion 58 and the inside of the second cooling passage portion 59 are connected with the cooling air passage 42p on the blade root 50 side. Thereby, cooling air of the cooling air passage 42p flows into the first cooling passage portion 58 and the second cooling passage portion 59 from the blade root 50 side of the blade 43a. The cooling air flowing into the first cooling passage portion 58 and the second cooling passage portion 59 flows from the blade root 50 to the blade tip 57, and cools an entire region of the blade 43a in the blade height direction from the blade root 50 to the blade tip 57.

The pillar portion 60 is provided between the first cooling passage portion 58 and the second cooling passage portion 59. The pillar portion 60 is continuously formed between the blade root 50 and the blade tip 57 of the blade main body 51. The pillar portion 60 is formed so as to extend between the negative pressure surface 53 and the positive pressure surface 54. The pillar portion 60 in the first embodiment is formed into a tapered shape where the width gradually decreases towards the blade tip 57, similarly to the blade main body 51. Herein, the direction along the camber line C in the above-described pillar portion 60 is referred to as a width direction.

The first cooling passage portion 58 is configured from a plurality of cooling passages 63. The plurality of cooling passages 63 are provided between the pillar portion 60 and the leading edge 55, and extend in the blade height direction. The cooling passages 63 configuring the first cooling passage portion 58 are provided along the camber line C. The first cooling passage portion 58 in the first embodiment is provided with two cooling passages 63. Hereinafter, of the two cooling passages 63, the cooling passage 63 near the leading edge 55 is referred to as a leading edge-side cooling passage 64, and the cooling passage 63 near the pillar portion 60 is referred to as a pillar portion-side cooling passage 65 (middle cooling passage).

A partition wall 70 is formed between the leading edge-side cooling passage 64 and the pillar portion-side cooling passage 65 of the first cooling passage portion 58. The partition wall 70 is formed such that the width in the camber line C direction is sufficiently smaller than the width of the above-described pillar portion 60.

The second cooling passage portion 59 is configured from the plurality of cooling passages 63, similarly to the first cooling passage portion 58. The plurality of cooling passages 63 are provided between the pillar portion 60 and the trailing edge 56, and extend in the blade height direction. The cooling passages 63 configuring the second cooling passage portion 59 are provided along the camber line C. The second cooling passage portion 59 in the first embodiment is provided with two cooling passages 63. Hereinafter, of the two cooling passages 63, the cooling passage 63 near the trailing edge 56 is referred to as a trailing edge-side cooling passage 67, and the cooling passage 63 near the pillar portion 60 is referred to as a pillar portion-side cooling passage 66 (middle cooling passage).

A partition wall 70 is formed between the trailing edge-side cooling passage 67 and the pillar portion-side cooling passage 66 of the second cooling passage portion 59, similarly to the first cooling passage portion 58. The width of the partition wall 70 in the camber line C direction is a width that is formed to be sufficiently smaller than the width of the above-described pillar portion 60, and is equal to the width of the partition wall 70 of the first cooling passage portion 58.

Herein, the width of the pillar portion 60 and the arrangement of the pillar portion 60 in the camber line C direction are set based on a temperature differential that can occur between the leading and trailing edges 55, 56 and a middle portion M of the blade main body 51 in the camber line C direction.

For example, if it is expected that the temperature differential that can occur between the leading and trailing edges 55, 56 and the middle portion M is large, the width of the pillar portion 60 in the camber line C direction is increased, and therefore, the temperature differential can be suppressed. This is because cooling of a position where the pillar portion 60 is disposed is hindered, and thus temperature reduction is suppressed.

If it is expected that the temperature differential that can occur between the leading and trailing edges 55, 56 and the middle portion M is large, the pillar portion 60 may be disposed particularly around a low temperature position of the middle portion M in the camber line C direction. Thereby, a position where temperature reduction is prone to occur can be efficiently suppressed from reducing in temperature.

In the first cooling passage portion 58, the flow channel cross-sectional area of the leading edge-side cooling passage 64 is smaller than the flow channel cross-sectional area of the pillar portion-side cooling passage 65. Cooling air is supplied to the leading edge-side cooling passage 64 and the pillar portion-side cooling passage 65. The pillar portion-side cooling passage 65 has a mechanism that hinders the flow of cooling air to the blade root 50 side or the blade tip 57 side. For example, the mechanism is an orifice provided on the blade root 50 side or a cavity portion of the tip shroud 52 provided on the blade tip 57. Therefore, the flow velocity of cooling air flowing through the leading edge-side cooling passage 64 is higher than the flow velocity of cooling air flowing through the pillar portion-side cooling passage 65. In other words, in the first cooling passage portion 58, the heat transfer coefficient of the cooling air flowing through the leading edge-side cooling passage 64 is higher than the heat transfer coefficient of the cooling air flowing through the pillar portion-side cooling passage 65, and therefore, the leading edge-side cooling passage 64 has higher cooling performance than the pillar portion-side cooling passage 65.

In the second cooling passage portion 59, the flow channel cross-sectional area of the trailing edge-side cooling passage 67 is smaller than the flow channel cross-sectional area of the pillar portion-side cooling passage 66 of the second cooling passage portion 59, similarly to the first cooling passage portion 58. Cooling air is supplied to the trailing edge-side cooling passage 67 and the pillar portion-side cooling passage 66. The pillar portion-side cooling passage 66 has a mechanism that hinders the flow of cooling air, similarly to the pillar portion-side cooling passage 65. Therefore, the flow velocity of cooling air flowing through the trailing edge-side cooling passage 67 is higher than the flow velocity of cooling air flowing through the pillar portion-side cooling passage 66. In other words, the trailing edge-side cooling passage 67 has higher cooling performance than the pillar portion-side cooling passage 66.

Figure 5:
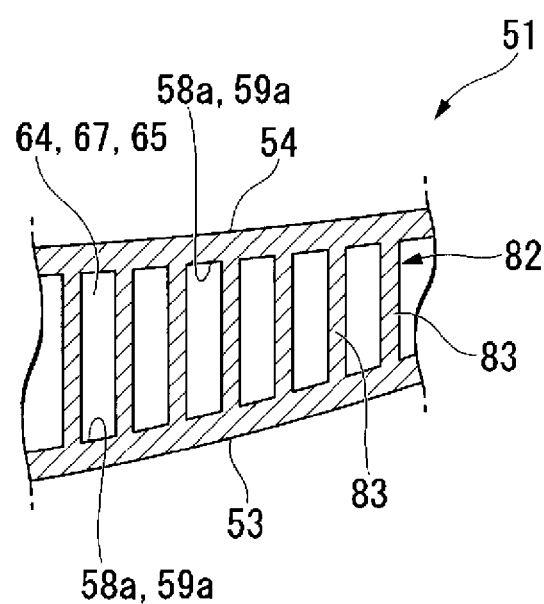
FIG. 5 is a partial cross-sectional view illustrating a pillar-shaped pin fin according to the first embodiment of the invention.

FIG. 5 is a partial cross-sectional view illustrating a pillar-shaped pin fin according to the first embodiment of the invention.

As illustrated in FIG. 4 and FIG. 5, a pillar-shaped pin fin 82 is provided in the first cooling passage portion 58 and the second cooling passage portion 59. The pillar-shaped pin fin 82 is provided with a plurality of projecting portions 83. The projecting portions 83 are formed into a pillar shape extending between an inner surface of the negative pressure surface 53 and an inner surface of the positive pressure surface 54. Herein, FIG. 4 illustrates an example where the pillar-shaped pin fins 82 are provided on the entire surface of inner wall surfaces 58a, 59a of the leading edge-side cooling passage 64, trailing edge-side cooling passage 67, and pillar portion-side cooling passages 65, 66. However, the extent that the pillar-shaped pin fins 82 are provided is not limited to the entire surface. For example, a region where the pillar-shaped pin fins 82 are not formed may be provided on a portion of the inner wall surfaces 58a, 59a in the blade height direction, or a region where the pillar-shaped pin fins 82 are not formed may be provided on a portion of the inner wall surfaces 58a, 59a in the extension direction of the camber line C. Herein, FIG. 3 omits an illustration of the pillar-shaped pin fins 82.

As illustrated in FIG. 4, the pillar-shaped pin fins 82 have a first projecting portion 83a and a second projecting portion 83b with different sizes as the projecting portion 83. The first projecting portion 83a is provided on the inner wall surfaces 58a, 59a of the pillar portion-side cooling passages 65, 66. The second projecting portion 83b is provided on the inner wall surfaces 58a, 59a of the leading edge-side cooling passage 64 and the trailing edge-side cooling passage 67. The second projecting portion 83b is formed to be relatively smaller than the first projecting portion 83a. For example, the second projecting portion 83b is formed such that the surface area thereof is smaller than that of the first projecting portion 83a.

Figure 6:
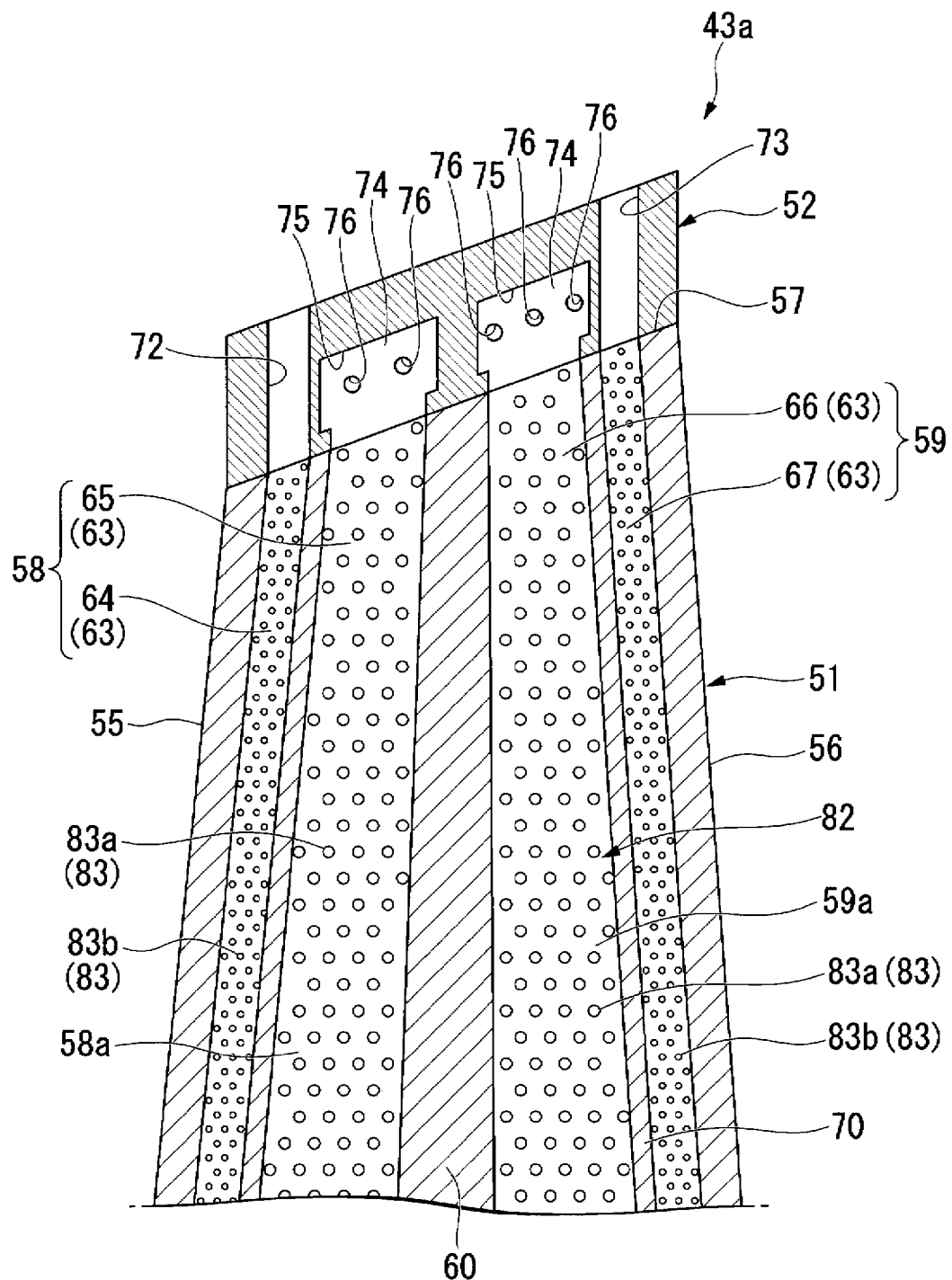
FIG. 6 is an enlarged view near a blade tip of the blade in FIG. 3 according to the first embodiment of the invention.
Figure 7:
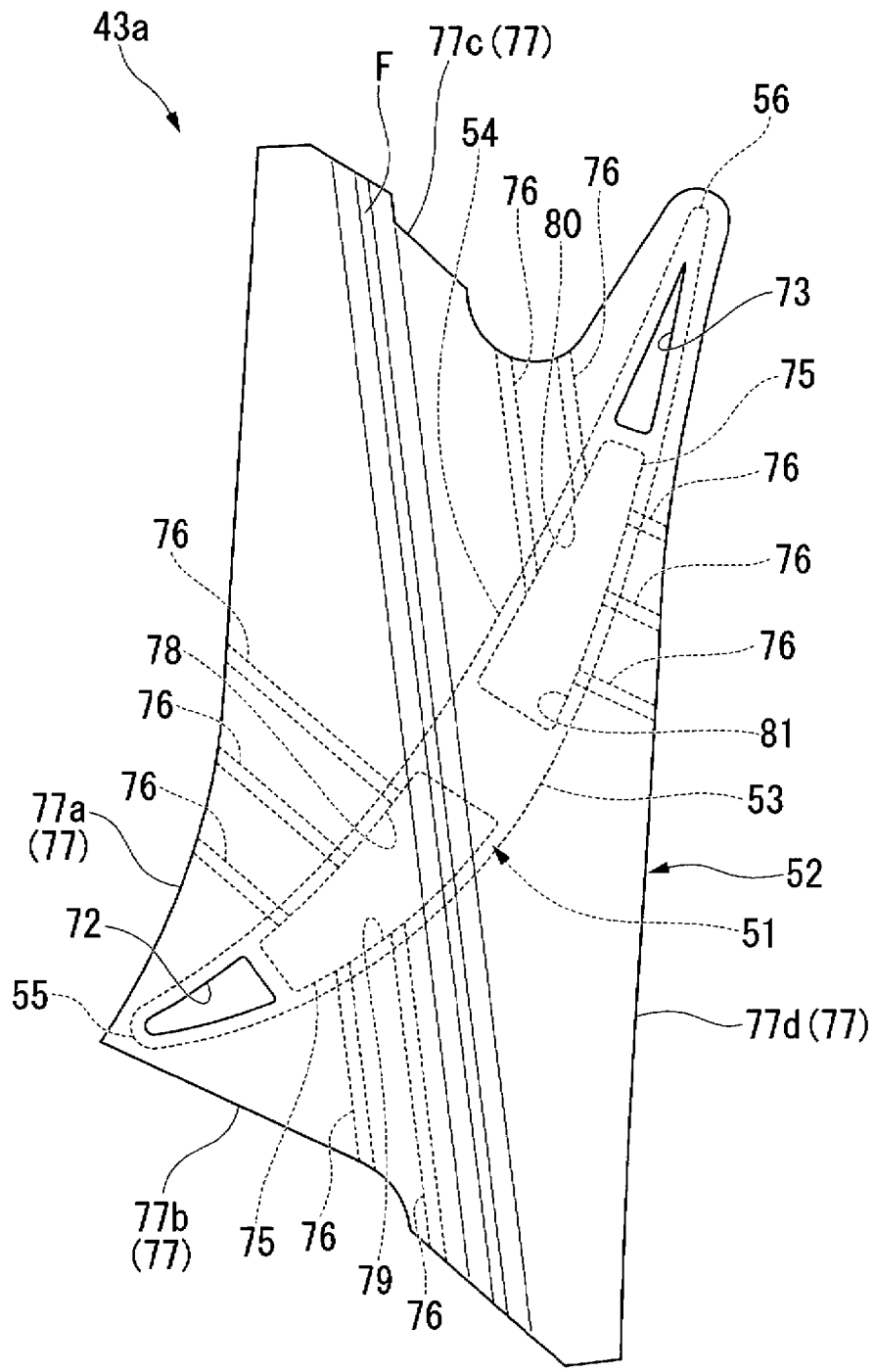
FIG. 7 is a plan view of a tip shroud according to the first embodiment of the invention.

FIG. 6 is an enlarged view near the blade tip of the blade in FIG. 3 according to the embodiment of the invention. FIG. 7 is a plan view of a tip shroud according to the embodiment of the invention.

As illustrated in FIG. 6 and FIG. 7, the tip shroud 52 is integrally provided on the blade tip 57 of the blade main body 51. The plurality of blades 43a are disposed in the circumferential direction, and therefore, the tip shrouds 52 form an annular shape continuing in the circumferential direction Dc.

A fin F (refer to FIG. 7) is provided on the tip shroud 52 at a center position or the like in the axial direction Da of the outer circumferential surface thereof. The fin F projects towards the outer side in the radial direction Dro. Therefore, a slight gap is formed between the fin F and the ring segment 45c, and thus the amount of leaking of the combustion gas G can be reduced. If the gap between the blade 43a and the ring segment 45c is reduced for some reason, the fin F first contacts the ring segment 45c. Thus, the fin F first contacts the ring segment 45c, and therefore, damage of the ring segment 45c or the blade 43a can be reduced.

The tip shroud 52 is provided with a first discharge passage 72, a second discharge passage 73, and a third discharge passage 74. The first discharge passage 72, second discharge passage 73, and third discharge passage 74 respectively discharge cooling air flowing inside the above-described blade main body 51 to the outside of the blade main body 51.

As illustrated in FIG. 6, the first discharge passage 72, third discharge passage 74, and second discharge passage 73 are formed in this order inside the tip shroud 52 from the leading edge 55 side to the trailing edge 56 side.

The first discharge passage 72 discharges cooling air flowing through the leading edge-side cooling passage 64. The first discharge passage 72 is formed so as to penetrate the tip shroud 52 in a direction in which the leading edge-side cooling passage 64 extends (blade height direction). In other words, the first discharge passage 72 extends such that the leading edge-side cooling passage 64 is extended to the outer side in the radial direction Dro, and opens toward the outer side in the radial direction Dro. The first discharge passage 72 in the first embodiment has the same flow path cross-sectional shape as the leading edge-side cooling passage 64. In other words, the cooling air flowing through the leading edge-side cooling passage 64 flows to the outer side in the radial direction Dro from the blade root 50 of the blade 43a to the blade tip 57, and is discharged as is to the outer side in the radial direction Dro of the tip shroud 52 without changing the direction of the flow. Thereby, the cooling air blows out from the tip shroud 52, and therefore, the leading edge-side cooling passage 64 is a flow channel with low pressure loss, and thus the flow velocity of the cooling air can be increased.

The second discharge passage 73 discharges cooling air flowing through the trailing edge-side cooling passage 67. The second discharge passage 73 is formed so as to penetrate the tip shroud 52 in a direction in which the trailing edge-side cooling passage 67 extends (blade height direction). In other words, the second discharge passage 73 extends such that the trailing edge-side cooling passage 67 is extended to the outer side in the radial direction Dro, and opens toward the outer side in the radial direction Dro, similarly to the first discharge passage 72. The second discharge passage 73 in the first embodiment has the same flow path cross-sectional shape as the trailing edge-side cooling passage 67. In other words, the cooling air flowing through the trailing edge-side cooling passage 67 flows to the outer side in the radial direction Dro from the blade root 50 to the blade tip 57 of the blade 43a, and is discharged as is to the outer side in the radial direction Dro of the tip shroud 52 without changing the direction of the flow. Thereby, the cooling air blows out from the tip shroud 52, and therefore, the trailing edge-side cooling passage 67 is a flow channel with low pressure loss, and thus the flow velocity of the cooling air can be increased.

The third discharge passage 74 discharges cooling air flowing through the pillar portion-side cooling passages 65, 66 to the outside of the blade 43a. The third discharge passage 74 is provided with a cavity portion 75 and a passage main body portion 76. Two cavity portions 75 are provided in the first embodiment. The cavity portions 75 are respectively provided on the outer side in the radial direction Dro of the pillar portion-side cooling passage 65 of the first cooling passage portion 58, and on the outer side in the radial direction Dro of the pillar portion-side cooling passage 66 of the second cooling passage portion 59. The cavity portions 75 respectively connect with the pillar portion-side cooling passage 65 of the first cooling passage portion 58, and connect with the pillar portion-side cooling passage 66 of the second cooling passage portion 59. In other words, the cavity portions 75 do not connect to the leading edge-side cooling passage 64 and the trailing edge-side cooling passage 67.

The passage main body portion 76 extends along the tip shroud 52 as illustrated in FIG. 7. In other words, the passage main body portion 76 extends in a direction intersecting a direction in which the pillar portion-side cooling passages 65, 66 extend (blade height direction). A plurality of the passage main body portions 76 are provided, which open in a side surface of the tip shroud 52. The passage main body portions 76 in the first embodiment extend along the tip shroud 52 from the cavity portion 75, and open in a side surface 77 of the tip shroud 52. The passage main body portions 76 extend in a direction the negative pressure surface 53 of the blade main body 51 faces and a direction the positive pressure surface 54 faces. In the first embodiment, the plurality of passage main body portions 76 extend toward the nearest side surface 77 of the tip shroud 52 from the cavity portions 75.

More specifically, the third discharge passage 74 has a plurality of the passage main body portions 76 formed between an inner side surface 78 near the positive pressure surface 54 of the cavity portion 75 on a side near the leading edge 55 side, and a side surface 77a of the tip shroud 52 facing the upstream side Dau. Similarly, the third discharge passage 74 has a plurality of the passage main body portions 76 formed between an inner side surface 79 near the negative pressure surface 53 of the cavity portion 75 on a side near the leading edge 55 side, and a side surface 77b of the tip shroud 52 facing the circumferential direction Dc.

Furthermore, the third discharge passage 74 has a plurality of the passage main body portions 76 formed between an inner side surface 80 near the positive pressure surface 54 of the cavity portion 75 on the trailing edge 56 side, and a side surface 77c of the tip shroud 52 facing the circumferential direction Dc. Similarly, the third discharge passage 74 has a plurality of the passage main body portions 76 formed between an inner side surface 81 near the negative pressure surface 53 of the cavity portion 75 on the trailing edge 56 side, and a side surface 77d of the tip shroud 52 facing the downstream side Dad.

A case where the passage main body portions 76 are formed in a straight line is exemplified in the first embodiment. However, the passage main body portions 76 are not limited to a straight line. For example, the passage main body portions 76 may have a shape including a curved line, such as a circular arc or S shape. Furthermore, a case where the passage main body portions 76 that open in the same side surface 77 are disposed parallel to each other is exemplified, but the portions are not limited to being parallel. The passage main body portions may be disposed so as to be separated from each other as the portions approach the side surface 77.

According to the above-described first embodiment, cooling air flows in the first cooling passage portion 58 where the projecting portion 83 is formed on the inner wall surface 58a, and therefore, the leading edge 55 side of the blade main body 51 can be efficiently cooled. Similarly, cooling air flows in the second cooling passage portion 59 where the projecting portion 83 is formed on the inner wall surface 59a, and therefore, the trailing edge 56 side of the blade main body 51 can be cooled. In particular, the leading edge 55 side and the trailing edge 56 side which are prone to reach a high temperature can be effectively cooled by the first cooling passage portion 58 and the second cooling passage portion 59, and the pillar portion 60 is provided on a portion between the leading edge 55 and the trailing edge 56 which is relatively less likely to reach a high temperature, and therefore, the cross-sectional area of the entire cooling passage can be reduced.

Furthermore, the pillar portion 60 is continuously formed between the blade tip 57 and the blade root 50 of the blade main body 51, between the first cooling passage portion 58 and the second cooling passage portion 59, and therefore, cooling air does not flow at the position where the pillar portion 60 is formed. Therefore, the turbine blade of the present embodiment can suppress temperature reduction of the middle portion M between the first cooling passage portion 58 and the second cooling passage portion 59. In other words, a temperature differential can be prevented from occurring between the leading and trailing edges 55, 56 and the middle portion M between the first cooling passage portion 58 and the second cooling passage portion 59, and heating of the cooling air flowing through the cooling passage can be suppressed. Furthermore, the pillar portion 60 is provided, and therefore, the strength of the blade 43a can be improved. As a result, thermal warpage can be suppressed and sufficient strength can be ensured.

Furthermore, the turbine blade of the present embodiment has a structure where the pillar-shaped pin fins 82 are provided in the first cooling passage portion 58 and the second cooling passage portion 59, and therefore, a cooling effect can be achieved while a constant cross-sectional area as compared to conventional multiholes is ensured, and thereby, pressure loss when the cooling air flows through the cooling passage can be minimized, and the supply pressure of the cooling air can be suppressed. Therefore, the supply amount of cooling air required for cooling the blades 43a can be minimized.

Furthermore, according to the above-described first embodiment, the leading edge-side cooling passage 64 in the first cooling passage portion 58 has a flow channel cross-sectional area smaller than the flow channel cross-sectional area of the pillar portion-side cooling passage 65, and thus is a flow channel with low pressure loss. In contrast, the pillar portion-side cooling passage 65 is a flow channel with high pressure loss due to a mechanism that hinders the flow of cooling air (for example, the cavity portion 75 of the tip shroud 52 or an orifice provided on the blade root 50 side). Therefore, with the turbine blade of the present embodiment, the flow velocity of cooling air flowing through the leading edge-side cooling passage 64 can be increased, and cooling performance can be improved as the leading edge 55 is approached. As a result, the leading edge 55 side in which the leading edge-side cooling passage 64 is provided and which is prone to reach a relatively high temperature can be effectively cooled as compared to a portion where the pillar portion-side cooling passage 65 is provided, and a temperature differential between the leading edge 55 and the pillar portion 60 can be further suppressed from occurring, and the supply amount of cooling air required for cooling the leading edge 55 side of the blade 43a can be minimized.

Similarly, the trailing edge-side cooling passage 67 in the second cooling passage portion 59 has a flow channel cross-sectional area smaller than the flow channel cross-sectional area of the pillar portion-side cooling passage 66, and thus is a flow channel with low pressure loss. In contrast, the pillar portion-side cooling passage 66 is a flow channel with high pressure loss due to a mechanism that hinders the flow of cooling air (for example, the cavity portion 75 or an orifice provided on the blade root 50 side). Therefore, with the turbine blade of the present embodiment, the flow velocity of cooling flowing through the trailing edge-side cooling passage 67 can be increased, and cooling performance can be improved as the trailing edge 56 is approached. As a result, the trailing edge 56 side in which the trailing edge-side cooling passage 67 is provided and which is prone to reach a relatively high temperature can be effectively cooled as compared to a portion where the pillar portion-side cooling passage 66 is provided, and a temperature differential between the trailing edge 56 and the pillar portion 60 can be further suppressed from occurring, and the supply amount of cooling air required for cooling the trailing edge 56 side of the blade 43a can be minimized.

Furthermore, according to the above-described first embodiment, the first projecting portion 83a is formed to be smaller than the second projecting portion 83b. Therefore, the turbine blade of the present embodiment can suppress pressure loss of cooling air flowing through the leading edge-side cooling passage 64 and the trailing edge-side cooling passage 67. On the other hand, pressure loss of cooling air flowing through the pillar portion-side cooling passages 65, 66 can be increased as compared to the leading edge-side cooling passage 64 and the trailing edge-side cooling passage 67. Thereby, the flow velocity of cooling air flowing through the pillar portion-side cooling passage 65, 66 can be reduced as compared to the flow velocity of cooling air flowing through the leading edge-side cooling passage 64 and the trailing edge-side cooling passage 67. As a result, the leading edge 55 side and the trailing edge 56 side can be effectively cooled, and the amount of cooling air flowing through the pillar portion-side cooling passages 65, 66 is reduced, and therefore, the supply amount of cooling air can be suppressed as a whole. Furthermore, even in an environment prone to a large temperature differential between the leading and trailing edges 55, 56 and the middle portion M between the leading edge 55 and the trailing edge 56, a temperature differential between the leading and trailing edges 55, 56 and the middle portion M can be further suppressed from occurring.

Furthermore, if the blade 43a of the turbine blade of the present embodiment has the tip shroud 52, cooling air flowing through the leading edge-side cooling passage 64 toward the blade tip 57 from the blade root 50 of the blade main body 51 can be discharged to the outside through the first discharge passage 72 of the tip shroud 52. Furthermore, cooling air flowing through the trailing edge-side cooling passage 67 toward the blade tip 57 from the blade root 50 of the blade main body 51 can be discharged to the outside through the second discharge passage 73 of the tip shroud 52. Furthermore, cooling air flowing through the pillar portion-side cooling passages 65, 66 toward the blade tip 57 from the blade root 50 of the blade main body 51 can be discharged to the outside through the third discharge passage 74 of the tip shroud 52. As a result, cooling air flowing through the leading edge-side cooling passage 64, trailing edge-side cooling passage 67, and pillar portion-side cooling passages 65, 66 can be separately discharged to the outside of the blade 43a. Furthermore, by simply changing the flow channel cross-sectional areas of the first discharge passage 72, second discharge passage 73, and third discharge passage 74, the flow velocity of the cooling air flowing through the leading edge-side cooling passage 64, trailing edge-side cooling passage 67, and pillar portion-side cooling passages 65, 66 can be easily differentiated.

Furthermore, the first discharge passage 72 and the second discharge passage 73 of the turbine blade of the present embodiment respectively penetrate the tip shroud 52 in the blade height direction, and therefore, the first discharge passage 72 and the second discharge passage 73 can be formed to be shorter. Therefore, pressure loss of cooling air flowing through the leading edge-side cooling passage 64 and the trailing edge-side cooling passage 67 can be suppressed from increasing, and the flow velocity of the cooling air can be suppressed from decreasing. As a result, the leading edge 55 and the trailing edge 56 of the blade main body 51 can be efficiently cooled.

Furthermore, with the turbine blade of the present embodiment, the passage main body portion 76 of the third discharge passage 74 is formed along the tip shroud 52, and therefore, cooling air flowing through the pillar portion-side cooling passages 65, 66 can cool the tip shroud 52 while being discharged to the outside through the third discharge passage 74.

Furthermore, with the turbine blade of the present embodiment, the passage length of the third discharge passage 74 can be increased as compared to the first discharge passage 72 or the second discharge passage 73. Therefore, the amount of cooling air flowing through the pillar portion-side cooling passages 65, 66 can be reduced as compared to the leading edge-side cooling passage 64 or the trailing edge-side cooling passage 67, and thus the supply amount of cooling air can be suppressed as a whole.

Furthermore, the cavity portion 75 with a large cross-sectional area is formed inside the tip shroud 52, and therefore, when processing the passage main body portion 76 from the side surface 77 toward the cavity portion 75, for example, a small amount of positional deviation is permitted. Therefore, the third discharge passage 74 can be easily formed. Furthermore, the tip shroud 52 is lightened, and therefore, the centrifugal load can be reduced.

Furthermore, the amount of cooling air for cooling the blade 23a can be reduced, and therefore, the efficiency of the gas turbine 10 can be improved.

Second Embodiment

Next, a second embodiment of the invention is described based on the drawings. The second embodiment is different from the above-described first embodiment only in the structure of the cooling passages formed inside the blade main body. Therefore, the same portions as in the first embodiment are described using the same reference signs, and duplicate descriptions are omitted.

Figure 8:
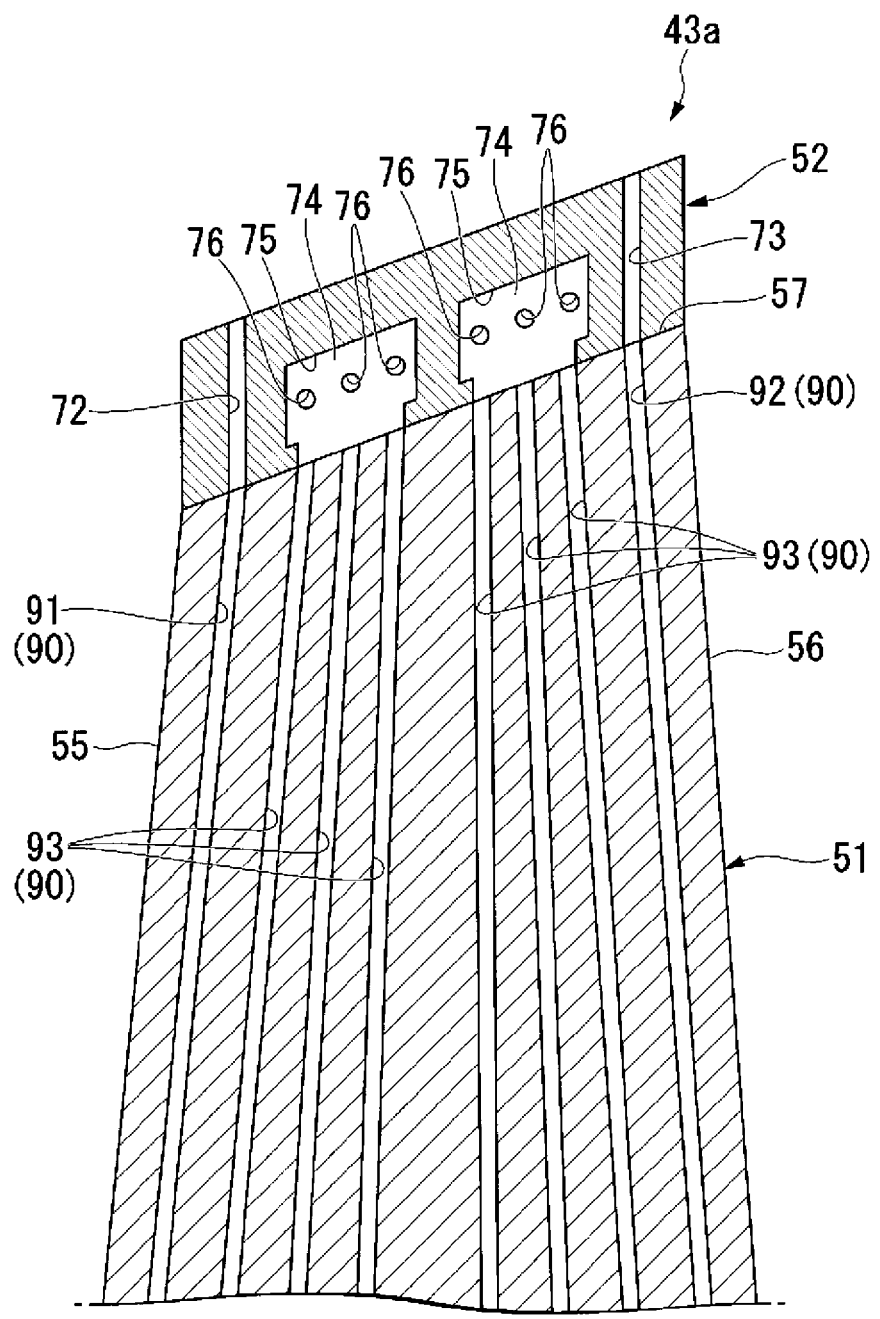
FIG. 8 is an enlarged view corresponding to FIG. 6 according to a second embodiment of the invention.

FIG. 8 is an enlarged view corresponding to FIG. 6 according to the second embodiment of the invention.

As illustrated in FIG. 8, the blade main body 51 of the blade 43a which is a turbine blade in the second embodiment is provided with a plurality of cooling holes 90 referred to as so-called "multiholes".

The cooling hole 90 is a cooling air flow channel, and extends in the blade height H direction intersecting an airfoil cross section of the blade 43a. The cooling holes 90 penetrate from the blade root 50 to the blade tip 57. The cooling holes 90 are further arranged in one row from the leading edge 55 toward the trailing edge 56. The centers of the cooling holes 90 of the present embodiment are each disposed on the camber line C.

The blade 43a is provided with the tip shroud 52, similarly to the above-described first embodiment.

The tip shrouds 52 are individually provided with the first discharge passage 72, the second discharge passage 73, and the third discharge passage 74.

Of the cooling holes 90, a leading edge-side cooling hole (leading edge-side cooling passage) 91 disposed on the most leading edge side is connected to the first discharge passage 72. Of the cooling holes 90, a trailing edge-side cooling hole (trailing edge-side cooling passage) 92 disposed on the most trailing edge side is connected to the second discharge passage 73. Middle cooling holes (middle cooling passages) 93 excluding the leading edge-side cooling hole 91 and the trailing edge-side cooling hole 92 are connected to the cavity portion 75 of the third discharge passage 74. The third discharge passage 74 is provided with the cavity portion 75 and the passage main body portion 76, similarly to the first embodiment. A plurality of the middle cooling holes 93 are connected to one cavity portion 75. In other words, cooling air flowing through the middle cooling holes 93 merges at the cavity portion 75, and then splits into the plurality of passage main body portions 76 connected to the cavity portion 75. Herein, if the blade main body 51 is provided with multiholes as with the second embodiment, the cooling hole 90 is not provided with the pillar-shaped pin fin 82 of the first embodiment.

According to the above-described second embodiment, even if the blade main body 51 is provided with multiholes, cooling air flowing through the leading edge-side cooling hole 91 toward the blade tip 57 from the blade root 50 of the blade main body 51 can be discharged to the outside through the first discharge passage 72 of the tip shroud 52, similarly to the first embodiment. Furthermore, cooling air flowing through the trailing edge-side cooling hole 92 toward the blade tip 57 from the blade root 50 of the blade main body 51 can be discharged to the outside through the second discharge passage 73 of the tip shroud 52. Furthermore, cooling air flowing through the middle cooling holes 93 toward the blade tip 57 from the blade root 50 of the blade main body 51 can be discharged to the outside through the third discharge passage 74. Therefore, the flow velocity of the cooling air flowing through the leading edge-side cooling hole 91 and the trailing edge-side cooling hole 92 can be increased, and the leading edge 55 and the trailing edge 56 which reach relatively high temperatures can be intensively cooled. Furthermore, with regard to a portion with a relatively low temperature between the leading edge 55 and the trailing edge 56, the flow velocity of the cooling air flowing through the middle cooling holes 93 can be reduced, and thus an excess supply of the cooling air can be suppressed. As a result, the blade main body 51 can be efficiently cooled while increase in the amount of cooling air is suppressed.

The invention is not limited to the above-described embodiments, and includes various modifications added to the above-described embodiments without deviating from the gist of the invention. In other words, specific shapes, configurations, and the like in the embodiments are merely examples and may be appropriately modified.

Figure 9:
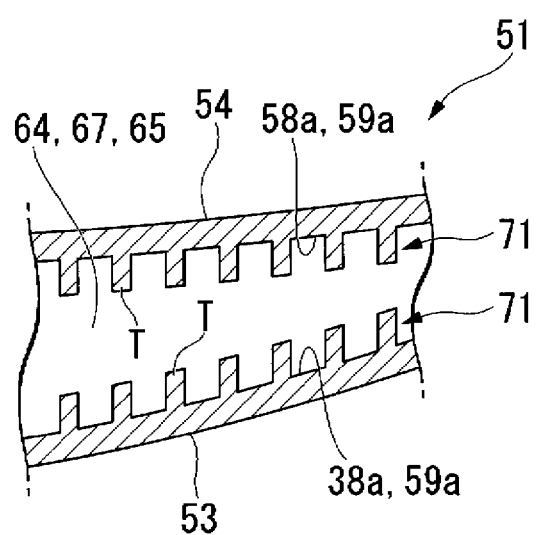
FIG. 9 is a partial cross-sectional view corresponding to FIG. 5 according to a modified example of the first embodiment of the invention.

FIG. 9 is a partial cross-sectional view corresponding to FIG. 5 according to a modified example of the first embodiment of the invention.

For example, the above-described first embodiment described a case where the pillar-shaped pin fins 82 were formed as one example. However, the invention is not limited to the pillar-shaped pin fin 82. For example, as with the modified example illustrated in FIG. 9, a one-side pin fin 71 may be provided in place of the pillar-shaped pin fin 82. The one-side pin fins 71 are protruding portions (projecting portions) T that project from the inner wall surfaces 58a, 59a of the first cooling passage portion 58 and the second cooling passage portion 59 toward the inside, and may be provided on the inner wall surfaces 58a, 59a of the leading edge-side cooling passage 64, trailing edge-side cooling passage 67, and pillar portion-side cooling passages 65, 66. The one-side pin fins 71 may be provided with a first protruding portion (first projecting portion: not illustrated in the drawing) and a second protruding portion (second projecting portion: not illustrated in the drawing) with mutually different sizes, similarly to the above-described pillar-shaped pin fins 82. Furthermore, for example, the first protruding portion may be provided on the inner wall surfaces 58a, 59a of the pillar portion-side cooling passages 65, 66, and the second protruding portion may be provided on the inner wall surfaces 58a, 59a of the leading edge-side cooling passage 64 and the trailing edge-side cooling passage 67. In this case, the second protruding portion may be formed to be relatively smaller than the first protruding portion. For example, the second protruding portion may be formed such that the surface area thereof is smaller than the surface area of the first protruding portion.

Furthermore, the above-described first embodiment described a case where the blade main body 51 was provided with the pillar portion 60 as one example. However, the pillar portion 60 may be omitted. In other words, two pillar portion-side cooling passages 65, 66 may be substituted by one cooling passage 63 which is a middle cooling passage.

Furthermore, the first embodiment described a case where the second projecting portion 83b was smaller than the first projecting portion 83a as one example. However, the invention is not limited to this configuration. For example, the number of the second projecting portions 83b per unit area may be smaller than the number of the first projecting portions 83a per unit area, while the first projecting portions 83a and the second projecting portions 83b are formed in the same size. Furthermore, the first projecting portion 83a and the second projecting portion 83b may be formed with the same configuration, in other words, in the same size and same number.

Furthermore, the above-described embodiments described a case where the cooling medium was air as an example, but the cooling medium is not limited to air.

Furthermore, the above-described embodiments described a case where the third discharge passage 74 has the cavity portion 75. However, the cavity portion 75 may be omitted.

Furthermore, the above-described embodiments described a case where the passage main body portion 76 of the third discharge passage 74 was formed along the tip shroud 52 and opened in the side surface 77. However, the invention is not limited to this configuration. The passage main body portion 76 may open in the tip shroud 52 near the side surface 77, for example.

Furthermore, the above-described embodiments described a case where the first discharge passage 72 and the second discharge passage 73 penetrate the tip shroud 52 in the blade height direction. However, the penetrating direction of the first discharge passage 72 and the second discharge passage 73 is not limited to the blade height direction, provided that these discharge passages can be formed to be shorter than the third discharge passage 74.

Furthermore, the above-described embodiments described the blades 43a of the third blade row 43 as one example. However, the blades 43a are preferably blades provided with the tip shroud 52, and may be blades 43a other than in the third blade row 43.

INDUSTRIAL APPLICABILITY

The invention can be applied to a turbine blade and a gas turbine, and can realize efficient cooling while suppressing increase in the amount of cooling air.

REFERENCE SIGNS LIST

10 Gas turbine
11 Gas turbine rotor
15 Gas turbine casing
20 Compressor
21 Compressor rotor
22 Rotor shaft
23 Blade row
25 Compressor casing
26 Vane row
26a Vane
30 Combustor
40 Turbine
41 Turbine rotor
42 Rotor shaft
42p Cooling air passage
43 Blade row
43a Blade
45 Turbine casing
45a Outer casing
45b Inner casing
45c Ring segment
45p Cooling air passage
46 Vane row
46a Vane
49 Combustion gas flow channel
50 Blade root
51 Blade main body
52 Tip shroud
53 Negative pressure surface
54 Positive pressure surface
55 Leading edge
56 Trailing edge
57 Blade tip
58 First cooling passage portion
58a Inner wall surface
59 Second cooling passage portion
59a Inner wall surface
60 Pillar portion 62 First end portion
63 Cooling passage
64 Leading edge-side cooling passage
65 Pillar portion-side cooling passage
66 Pillar portion-side cooling passage
67 Trailing edge-side cooling passage
70 Partition wall
71 One-side pin fin
72 First discharge passage
73 Second discharge passage
74 Third discharge passage
75 Cavity portion
76 Passage main body portion
77 Side surface
77a Side surface
77b Side surface
77c Side surface
77d Side surface
78 Inner surface
79 Inner surface
80 Inner surface
81 Inner surface
82 Pillar-shaped pin fin
83 Projecting portion
90 Cooling hole
91 Leading edge-side cooling hole
92 Trailing edge-side cooling hole
93 Middle cooling hole
83a First projecting portion
83b Second projecting portion
T Protruding portion
F Fin
M Middle portion

The invention claimed is:

1. A turbine blade, comprising a blade main body having a leading edge and a trailing edge, and having a positive pressure surface and a negative pressure surface between the leading edge and the trailing edge, wherein
the blade main body comprises a cooling passage where a cooling medium flows, demarcated and formed by an inner peripheral wall extending along the positive pressure surface and the negative pressure surface of the blade main body,
the cooling passage comprises:
a first cooling passage portion provided near the leading edge;
a second cooling passage portion provided near the trailing edge; and
a pillar portion provided between the first cooling passage portion and the second cooling passage portion,
the first cooling passage portion comprises:
a leading edge-side cooling passage provided near the leading edge; and
a first middle cooling passage demarcated by a partition wall from the leading edge-side cooling passage and provided near the pillar portion,
the second cooling passage portion comprises:
a trailing edge-side cooling passage provided near the trailing edge; and
a second middle cooling passage demarcated by a partition wall from the trailing edge-side cooling passage and provided near the pillar portion,
a first mechanism that hinders a flow of a cooling medium flowing through the first middle cooling passage is provided such that the flow velocity of a cooling medium flowing through the leading edge-side cooling passage is higher than the flow velocity of the cooling medium flowing through the first middle cooling passage,
a second mechanism that hinders a flow of a cooling medium flowing through the second middle cooling passage is provided such that the flow velocity of a cooling medium flowing through the trailing edge-side cooling passage is higher than the flow velocity of the cooling medium flowing through the second middle cooling passage,
a flow channel cross-sectional area of the leading edge-side cooling passage is smaller than a flow channel cross-sectional area of the first middle cooling passage, and
a flow channel cross-sectional area of the trailing edge-side cooling passage is smaller than a flow channel cross-sectional area of the second middle cooling passage.

2. The turbine blade according to claim 1, comprising a tip shroud provided on a blade tip of the blade main body, wherein
the tip shroud comprises:
a first discharge passage that discharges the cooling medium flowing through the leading edge-side cooling passage;
a second discharge passage that discharges the cooling medium flowing through the trailing edge-side cooling passage;
a third discharge passage that discharges the cooling medium flowing through the first middle cooling passage; and
a fourth discharge passage that discharges the cooling medium flowing through the second middle cooling passage, and
a passage length of each of the third discharge passage and the fourth discharge passage is longer than a passage length of each of the first discharge passage and the second discharge passage.

3. The turbine blade according to claim 2, wherein the first discharge passage penetrates the tip shroud in a blade height direction, and extends such that the leading edge-side cooling passage is extended in the blade height direction.

4. The turbine blade according to claim 2, wherein the second discharge passage penetrates the tip shroud in the blade height direction, and extends such that the trailing edge-side cooling passage is extended in the blade height direction.

5. The turbine blade according to claim 2, wherein
the third discharge passage includes a first passage main body portion extending in a direction intersecting the blade height direction,
the fourth discharge passage includes a second passage main body portion extending in a direction intersecting the blade height direction, and
each of the first passage main body portion and the second passage main body portion opens in a side surface of the tip shroud.

6. The turbine blade according to claim 5, wherein
the third discharge passage includes a first cavity portion connected to the first middle cooling passage and having a larger flow channel cross-sectional area than the first middle cooling passage,
the fourth discharge passage includes a second cavity portion connected to the second middle cooling passage and having a larger flow channel cross-sectional area than the second middle cooling passage, the first passage main body portion extends from the first cavity portion in a direction intersecting the blade height direction, and opens in the side surface of the tip shroud, and the second passage main body portion extends from the second cavity portion in a direction intersecting the blade height direction, and opens in the side surface of the tip shroud.

7. A gas turbine, comprising the turbine blade according to claim 1.

8. The turbine blade according to claim 1, wherein a width in a camber line direction of each of the partition walls is smaller than a width in the camber line direction of the pillar portion.

* * * * *